Dec. 28, 1965                    M. L. MILLER                  3,226,641
ELECTRONIC TYPE CONVERTER FOR PRODUCING A D.C. SIGNAL
PROPORTIONAL TO WATT INPUT
Filed Dec. 5, 1961
2 Sheets-Sheet 1
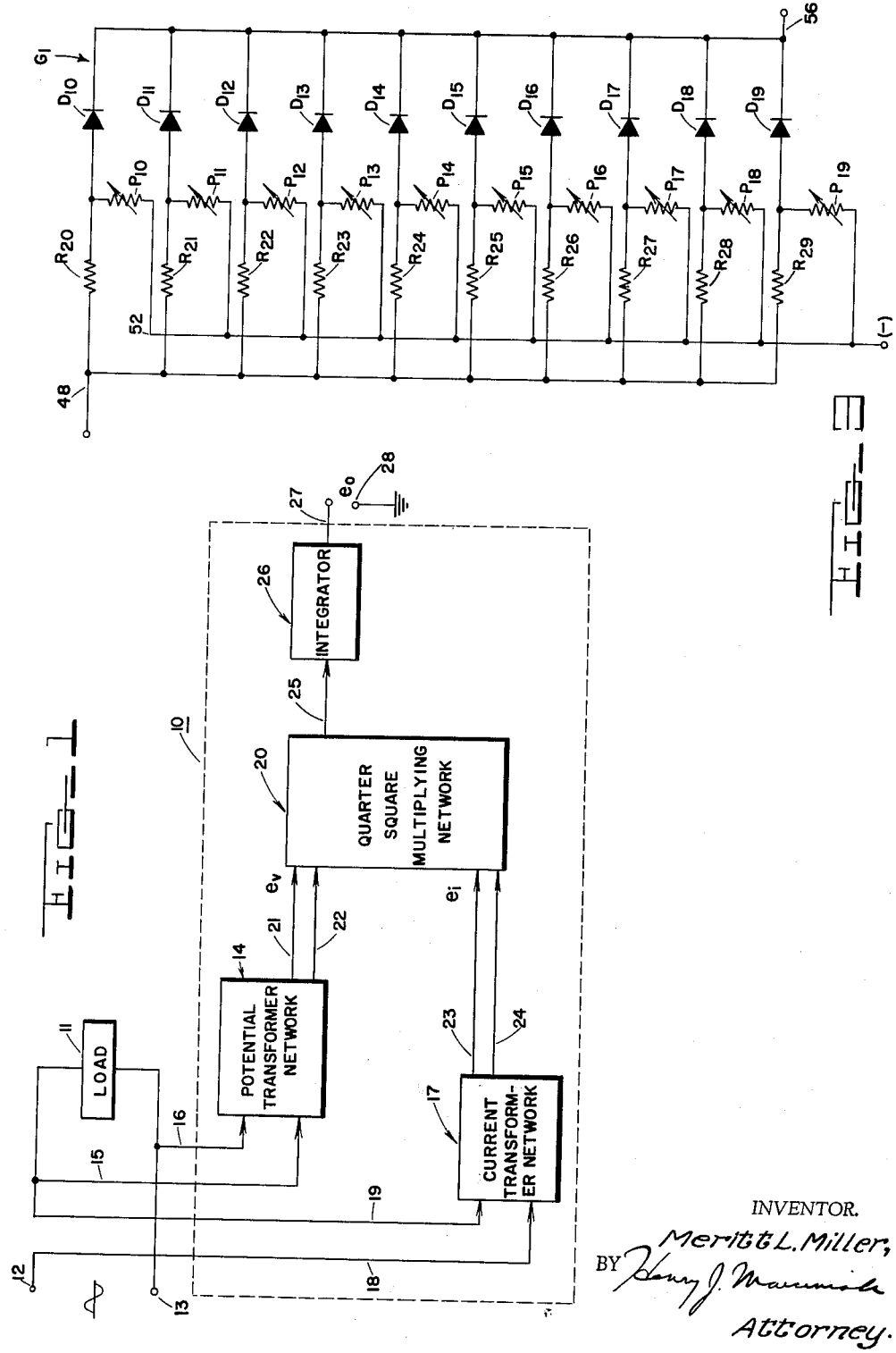
INVENTOR.
Meritt L. Miller,
BY
Attorney.

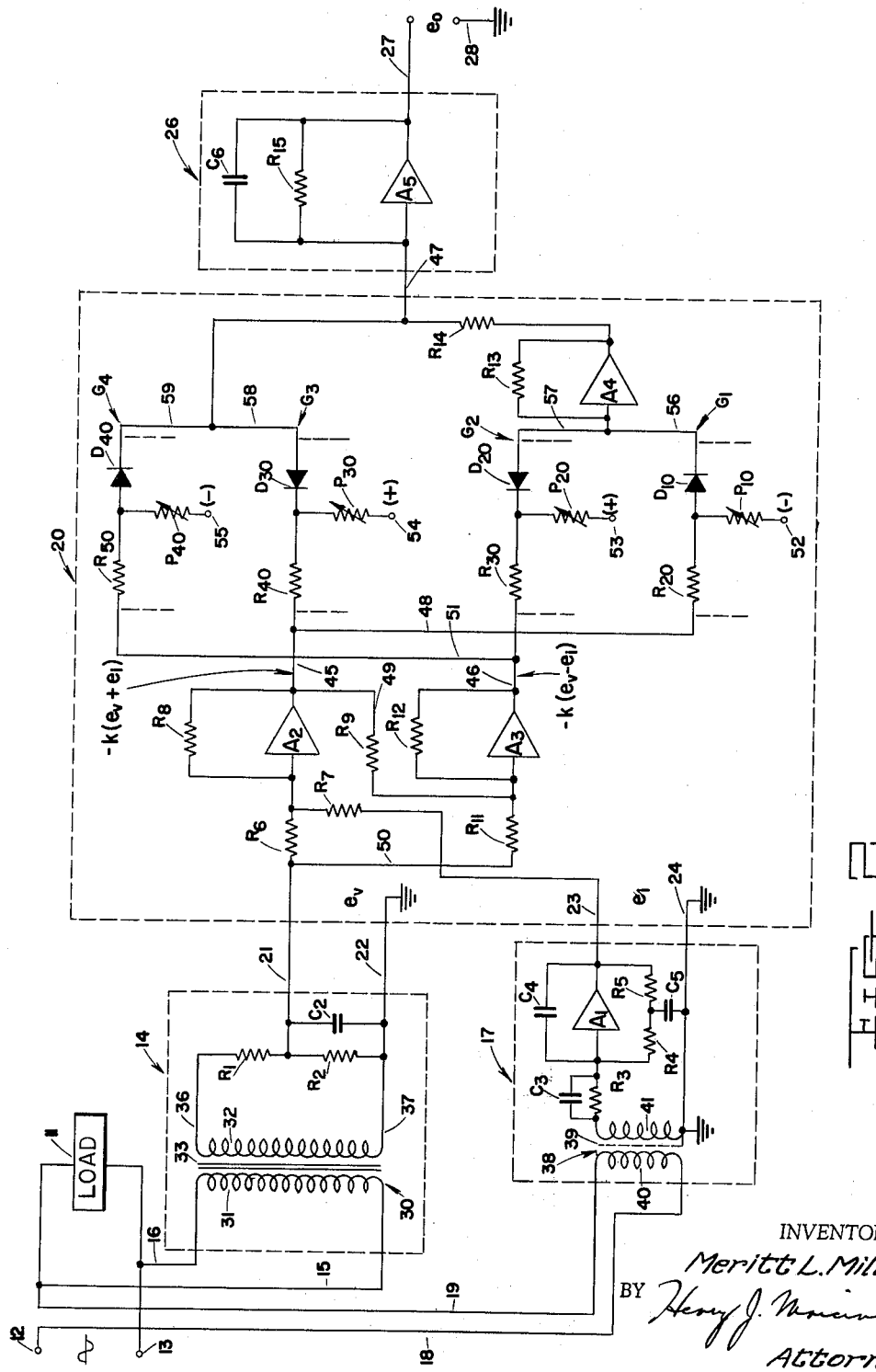

United States Patent Office 3,226,641
Patented Dec. 28, 1965

3,226,641
ELECTRONIC TYPE CONVERTER FOR PRODUCING A D.C. SIGNAL PROPORTIONAL TO WATT INPUT
Meritt L. Miller, Fort Wayne, Ind., assignor to General Electric Company, a corporation of New York
Filed Dec. 5, 1961, Ser. No. 157,064
7 Claims. (Cl. 324—142)

This invention relates to wattage converters and more particularly to such converters wherein alternating power consumed or supplied by an electrical apparatus is converted to a signal that is proportional to the wattage or power.

There are numerous applications where it is desirable to monitor wattage or power and provide an electrical signal proportional thereto. For example, in applications where X–Y recorders are used to record power, in digital and analogue computer systems, and in decision making equipment, it may be required that an electrical signal representing the true or real power consumed or supplied by electrical apparatus be provided. It is frequently desirable, if not necessary, that the electrical signal representing the wattage or power be accurately proportional to the power metered. The wattage converter should also be readily adaptable to applications requiring the conversion of polyphase watts and should be capable of handling a wide range of power line frequencies. Also, the wattage converter should have a rapid time response so that the signal proportional to the power will be indicative of substantially instantaneous variations in the power monitored. The losses in the wattage converter should be negligible so that no significant quantity of power is consumed by the converter.

Conventional wattmeters, such as a electrodynamic wattmeter, are wattage converters as the term is used herein. In an electrodynamic type of wattmeter one of a pair of coils is wound of the relatively heavy wire and carries the load current. The other coil is wound of fine wire and is connected in series with a resistor and in parallel with the load to monitor the voltage. While the fine wire voltage coil is movable the load current coil is not so that when current flows in the coils a torque is produced that is proportional to the instantaneous power, this torque causes the voltage coil to move in response to the wattage. Thus, in the dynamometer type of wattmeters instantaneous power or wattage is converted to torque. Such wattage converters, although capable of accurately metering power, do not provide as an output an electrical signal that is proportional to the power supplied to a load. Consequently, there has been a need for a wattage converter capable of monitoring electrical power consumed or supplied by an electrical apparatus and providing a voltage signal that gives an accurate quantitative indication of the true power or wattage.

Accordingly, it is a general object of the invention to provide an improved wattage converter capable of providing a signal that is directly proportional to the true power consumed or supplied by an electrical apparatus.

A more specific object of the invention is to provide an improved wattage converter capable of supplying voltage signal proportional to the instantaneous power consumed over a wide range of frequencies of the alternating power supply monitored.

It is still another object of the invention to provide an improved wattage converter that has a rapid response and draws a negligible amount of power from the alternating power supply monitored.

These and other objects and advantages of the invention are achieved in a wattage converter which includes a current transformer means adapted for monitoring the current of an alternating power supply and converting the current to a first electrical signal proportional to the current supplied and in phase therewith. Further, the apparatus includes a potential transformer means for monitoring the voltage of the alternating power supply and converting the voltage to a second electrical signal proportional thereto. The first and second electrical signals provided by the potential and current transformer means are coupled to the input of a quarter square multiplying circuit that converts the two signals to an output signal that is proportional to the product of the instantaneous values of the two input signals. The resultant output signal of the multiplying circuit is coupled to the input of an integrator which converts the input signal to an electrical signal that is proportional to the product of the average values of the current and the voltage of the power supply multiplied by the cosine of the phase angle thereby providing a signal indicative of the true wattage or real power. In accordance with the invention the wattage converter provides an apparatus for electronically metering alternating power.

Further aspects of the invention will become apparent from the more detailed description of the invention. It will be understood that the specification concludes with claims which particularly point out and distinctly claim the subject matter which I regard as my invention. The invention, however, both as to organization and method of operation, together with further objects and advantages thereof, may be best understood by reference to the following description taken in conjunction with the accompanying drawings in which:

FIGURE 1 is a block diagram of a preferred embodiment of the wattage converter of the invention;

FIGURE 2 is a schematic circuit diagram of the wattage converter illustrated in the block diagram of FIGURE 1; and FIGURE 3 is a schematic circuit diagram of a negatively biased diode function generator used in the embodiment of the invention illustrated in FIGURES 1 and 2.

Referring now more particularly to the block diagram of FIG. 1, a wattage converter is shown enclosed in a dashed rectangle and is generally identified by reference numeral 10. In the illustrated embodiment of the invention the wattage converter 10 was employed to monitor the power supplied to a load 11 connected across a pair of supply lines 12, 13 adapted for connection to an alternating power source (not shown).

A potential transformer network 14 is connected across the supply lines 12, 13 by electrical leads 15, 16 and transforms the voltage across the load 11 to a signal $e_v$ of small magnitude proportional to the load voltage. A current transformer network 17 is connected in series circuit relation with the load 11 by means of electrical leads 18, 19 and converts the load current to a voltage signal $e_i$ which is proportional to the load current. The voltage signals, $e_v$ and $e_i$, are fed into a quarter square multiplying circuit 20 by input leads 21, 22 and 23, 24, respectively. As will be hereinafter more fully described, the quarter square multiplying circuit 20 produces an output signal at output lead 25 that is proportional to the product of the instantaneous values of the two input voltages $e_v$, $e_i$.

In the quarter square multiplying circuit 20 multiplication of the input voltages $e_v$, $e_i$ is achieved by taking the difference between the square of their sum and the square of the difference between the voltages, $e_v$, $e_i$. The output signal of the quarter square multiplying circuit 20 is coupled to the input of an integrator 26 which produces a signal $e_0$ at output leads 27, 28 that is proportional to the average product of the load voltage and current multiplied by the cosine of the phase angle.

The voltage signal $e_0$ is proportional to the true or real wattage. As the terms "true wattage or real wattage" are used herein, they denote the average product of the root mean square values of the voltage and current monitored multiplied by the cosine of the phase angle between the voltage and current.

In FIGURE 2 I have illustrated a schematic circuit diagram of the exemplification of the invention shown in the block diagram of FIGURE 1. The corresponding parts are identified by like reference numerals. It will be seen that as shown in FIGURE 2, the load 11 is connected across supply lines 12, 13. The potential transformer network 14 is connected across supply lines 12, 13 by means of the leads 15, 16. It includes a potential transformer 30 having a primary winding 31, inductively coupled on a magnetic core 33 with a secondary winding 32. The primary winding 31 is connected across the electrical leads 15, 16 while the secondary winding 32 is connected across electrical leads 36, 37. The resistors $R_1$, $R_2$ connected across the secondary winding 32 serves as a voltage divider to provide a predetermined voltage $e_v$ at the input leads 21, 22 of the quarter square multiplying circuit. Capacitor $C_2$ may be used to compensate for small system phase shift errors.

The potential transformer network 14 converts the load voltage to the rated voltage of the quarter square multiplying circuit 20. In the exemplification of the invention to be hereinafter more fully described, the rated input voltage of the quarter square multiplying circuit was two volts R.M.S. Another function of the potential transformer network 14 is to provide system isolation for the quarter square multiplying circuit 20.

As is shown in FIGURE 2, the current transformer network 17 is connected in series with load 11 by the electrical leads 18, 19. It includes an air core current transformer 38 having a Faraday shield 39 to prevent electrostatic coupling between a primary winding 40 and a secondary winding 41. A resistor $R_3$ is connected in series circuit with the secondary winding 41 since the resistance of the secondary winding 41 is relatively high and may be influenced by temperature. Thus, the resistor $R_3$ compensates for temperature effects. A capacitor $C_3$ connected in shunt with resistor $R_3$ is used to compensate for the secondary inductance of the current transformer 38.

Since the output voltage across the secondary winding 41 of current transformer 38 leads the primary current by a phase angle of substantially ninety degrees, an integrating circuit comprised of an integrating capacitor $C_4$, an operational amplifier $A_1$, a pair of feedback resistors, $R_4$, $R_5$ and a bypass capacitor $C_5$, compensates for this phase lead. The integrating circuit used in the current transformer network 17 is more fully described and claimed in my copending application entitled "Integrating Circuit," filed October 25, 1961, Serial Number 147,594, now abandoned and assigned to the same assignee as the present invention. It will be understood that the time integral of a sinusoidal signal applied at the input of amplifier $A_1$ results in a signal at leads 23, 24 that is displaced ninety degrees with respect to the signal applied at the input of amplifier $A_1$.

The voltage signal $e_i$ applied at the input leads 23, 24 of the quarter square multiplying circuit 20 is in phase with the load current or current flowing in the primary winding 40 of the current transformer 38. It will be appreciated that either the current tarnsformer network 17, or the potential transformer network 14, or both, may be eliminated in applications where the magnitude of the current or potential monitored is within the ratings of the quarter square multiplying circuit 20.

Turning now to the quarter square multiplying circuit 20, the first portion of this circuit, which includes the operational amplifiers $A_2$, $A_3$, produces voltages, $-k(e_v+e_i)$ and $-k(e_v-e_i)$, at the output leads 45, 46 of the operational amplifier $A_2$, $A_3$. The letter "$k$," as used herein, is a proportionality constant denoting the amplification of a signal.

In the second or right hand portion of the quarter square multiplying circuit 20, as seen in FIGURE 2, four biased diode function generators $G_1$, $G_2$, $G_3$ and $G_4$, are employed to produce a signal at lead 47 that is proportional to the difference between the square of the voltage signal, $-k(e_v+e_i)$ and the square of the voltage signal, $-k(e_v-e_i)$. Since this difference is proportional to the product of the voltage signals $e_v$, $e_i$, the output signal at lead 47 is proportional in magnitude to this product or the product of the instantaneous values of the load voltage and current.

It will be noted that the input leads 21, 23 are connected in circuit with input resistors $R_6$, $R_7$ coupled to the summing junction of operational amplifier $A_2$. In the hereinafter described exemplification of the invention, feedback resistor $R_8$ had a resistive value 2.5 times as great as the resistive values of the separate input resistors $R_6$, $R_7$. Thus, the amplifier $A_2$ produced an inverted voltage signal equal to 2.5 times the sum of the input voltages $e_v$ and $e_i$ or in other words, the amplifier $A_2$ has an amplification $k$ equal to 2.5.

The output of operational amplifier $A_2$ is connected in circuit with biased diode generators $G_3$, $G_1$ by means of electrical leads 45, 48 and in circuit with input resistor $R_9$ of the operational amplifier $A_3$ by electrical lead 49. It will be seen that an input resistor $R_{11}$ is connected with input lead 21 by means of lead 50 so that the voltage signal $e_v$ is also summed up by operational amplifier $A_3$. A feedback resistor $R_{12}$ is provided having a resistive value with respect to resistor $R_9$ that results in unity gain for the voltage signal $-k(e_v+e_i)$ and results in a gain of $2k$ for the voltage signal $e_v$. Therefore, the operational amplifier $A_3$ produces a voltage signal that is equal to the sum of $-2ke_v$ plus $k(e_v+e_i)$ or $-k(e_v-e_i)$. This signal is applied to biased diode generators $G_2$ and $G_4$ by electrical leads 46 and 51 respectively.

Both positive and negative values of the voltage signals of amplifiers $A_2$, $A_3$ are converted by the biased diode function generators $G_1$, $G_2$, $G_3$ and $G_4$ to a signal proportional to the difference between the square of these voltage signals. In FIGURE 2, I have illustrated each of the biased diode function generators $G_1$, $G_2$, $G_3$ and $G_4$ schematically by a single diode branch thereof, the dashed lines indicating that a plurality of such branches are employed. Thus, biased diode function generator $G_1$ is represented schematically by the diode branch which includes a resistor $R_{20}$, a potentiometer $P_{10}$, a diode $D_{10}$ and an output lead 56. The terminal 52 of the potentiometer $P_{10}$ is provided for connection to a suitable negative bias source (not shown). It will be seen that the anode of diode $D_{10}$ is negatively biased, and only a signal of positive polarity, that will render the anode of diode $D_{10}$ positive with respect to its cathode, will cause it to conduct. Thus, function generator $G_1$ will conduct only when the polarity of the voltage signal, $-k(e_v+e_i)$, is positive and will convert positive values of this signal to a current signal in the output lead 56 that is proportional to the square of the voltage signal applied at its input lead 48.

Referring now more particularly to FIGURE 3, I have illustrated therein a more detailed schematic circuit diagram of the biased diode function generator $G_1$ used in the exemplification of the invention. The function generator $G_1$ includes diodes $D_{10}$, $D_{11}$, $D_{12}$, $D_{13}$, $D_{14}$, $D_{15}$, $D_{16}$, $D_{17}$, $D_{18}$ and $D_{19}$ which are poled so that cathodes are connected with output lead 56 and the anodes are connected in circuit with input resistors $R_{20}$, $R_{21}$, $R_{22}$, $R_{23}$, $R_{24}$, $R_{25}$, $R_{26}$, $R_{27}$, $R_{28}$, $R_{29}$, the potentiometers $P_{10}$, $P_{11}$, $P_{12}$, $P_{13}$, $P_{14}$, $P_{15}$, $P_{16}$, $P_{17}$, $P_{18}$, $P_{19}$ and input lead 48. The potentiometers are adjusted so that the resistive value provided in each diode branch produces a different voltage for each diode and so that as the input voltage increases from zero, the diodes successively conduct current to produce an output current at lead 56 that is proportional to the square of positive voltage applied at lead 48.

The point at which the individual diodes in the function generator $G_1$ begin to conduct is determined by the bias applied to the individual diode branches. The individual biases are set by the potentiometers so that the resultant current increases exponentially with reference to the input voltage.

It will be appreciated that although ten diodes were used in the function generators $G_1$, $G_2$, $G_3$ and $G_4$, this number can be readily varied. As more diodes are used, the biasing voltages can be closely trimmed so that the individual linear segments of the square function generated as the diodes successively conduct can be combined to achieve closer or more accurate approximations.

Referring again to FIGURE 2, the diode function generator $G_2$ is schematically represented by a diode branch which includes the resistor $R_{30}$, the potentiometer $P_{20}$, the terminal 53, diode $D_{20}$ and output lead 57. The diode $D_{20}$ is poled so that the output current in lead 57 is negative. Terminal 53 of the potentiometer $P_{20}$ is provided for connection with a suitable positive bias source (not shown). Thus, diode $D_{20}$ will not conduct until the voltage signal, $-k(e_v-e_i)$, at lead 46 is sufficiently negative to overcome the positive bias at the cathode of diode $D_{20}$. It will be apparent therefore that function generator $G_2$ will conduct for negative values of the voltage signal, $-k(e_v-e_i)$. In exemplification of the invention, ten diodes were employed in the function generator $G_2$ in an arrangement similar to that shown in FIGURE 3 except that the diodes were oppositely poled and positively biased.

Function generator $G_3$ is positively biased and is similar in its circuit configuration to the above described function generator $G_2$. In FIGURE 2, the function generator $G_3$ is schematically represented by one of its ten diode branches. This diode branch includes the resistor $R_{40}$, potentiometer $P_{30}$, a positively biased terminal 54, a diode $D_{30}$ and an output lead 58. Function generator $G_3$ will conduct for negative values of the voltage signal, $-k(e_v+e_i)$, and convert this voltage signal to a negative current at output lead 58 that is proportional to the square of the voltage signal.

To convert the positive values of the voltage signal, $-k(e_v-e_i)$, to a signal proportional to the square thereof, a negatively biased function generator $G_4$ is employed. The function generator $G_4$ is identical in its circuit configuration to function generator $G_1$ shown in FIGURE 3. In FIGURE 2, I have again schematically shown the function generator $G_4$ by illustrating only one of its ten diode branches. This diode branch includes an input resistor $R_{50}$, a potentiometer $P_{40}$, a negatively biased terminal 55, a diode $D_{40}$ and an output lead 59.

The four function generators $G_1$, $G_2$, $G_3$ and $G_4$ produce in their respective output leads 56, 57, 58 and 59, currents which are proportional the square of the positive and negative values of the voltage signals, $-k(e_v+e_i)$ and $-k(e_v-e_i)$. It will be noted that a sign reversing operational amplifier $A_4$ having a feedback resistor $R_{13}$ and an output resistor $R_{14}$ is employed to reverse the sign of the currents produced in output leads 56, 57 of function generators $G_1$, $G_2$. Thus, the resultant current in output lead 47 coupled to the integrator 26 represents the sum of the currents in output leads 58, 59 and the reversed currents in output leads 56, 57.

It will be understood that other multiplying circuits which are capable of converting a pair of input voltage signals to an output signal which is proportional to the product of the instantaneous values of the input voltage signals may be used in the practice of the present invention.

As shown in the embodiment of the invention illustrated in FIGURE 2, the integrator 26 is comprised of an operational amplifier $A_5$, an integrating capacitor $C_6$, a feedback resistor $R_{15}$ and output leads 27, 28. The resultant current produced by the quarter square multiplying circuit 20 is integrated by the integrator 26 to provide a voltage signal $e_0$ that is proportional to the average value of the product of the load voltage and current multiplied by the cosine of the phase angle or that is proportional to the true wattage or power.

The amplifiers $A_1$, $A_2$, $A_3$, $A_4$ and $A_5$ used in the embodiment of the invention illustrated in FIGURE 2 were chopper stabilized, high gain operational amplifiers. The voltage at the input of such operational amplifiers is maintained substantially at ground potential. The voltage of the output of the operational amplifier can swing both positive and negative. Where an input and a feedback resistor are employed in conjunction with the operational amplifier, the output voltage of the amplifier will be equal to the input voltage multiplied by the ratio of the resistive value of the feedback resistor to the resistive value of the input resistor.

Operational amplifiers of the type which may be used in the practice of the invention are described at pages 34–39 of the text entitled "Analog Methods" by Walter J. Karplus and Walter W. Soroka, second edition, 1959, published by McGraw-Hill Book Company, Inc.

A wattage converter employing essentially the following circuit components was constructed and reduced to practice:

*Potential transformer network 14*

| | |
|---|---|
| Primary winding 31 | 120 volts. |
| Secondary winding 32 | 6 volts. |
| Resistor $R_1$ | 400 ohms. |
| Resistor $R_2$ | 200 ohms. |
| Resistor $C_2$ | .01 microfarad. |

*Current transformer network 17*

| | |
|---|---|
| Primary winding 40 | 10 turns of copper wire having a diameter of .125 inch. |
| Secondary winding 41 | 15,000 turns of copper wire having a diameter of .005 inch. |
| Capacitor $C_3$ | 200 micro microfarads. |
| Resistor $R_3$ | 550,000 ohms. |
| Capacitor $C_4$ | .01 microfarad. |
| Capacitor $C_5$ | .068 microfarad. |
| Resistor $R_4$ | 2.2 megohms. |
| Resistor $R_5$ | 2.7 megohms. |
| Operational amplifier $A_1$ | G. A. Philbrick Type K2WJ. |

*Quarter square multiplying circuit 20*

| | |
|---|---|
| Resistor $R_6$, $R_7$ | 200,000 ohms. |
| Resistor $R_8$ | 500,000 ohms. |
| Resistor $R_9$, $R_{12}$ | 1,050,000 ohms. |
| Resistor $R_{11}$ | 210,000 ohms. |
| Amplifiers $A_2$, $A_3$, $A_4$, $A_5$ | G. A. Philbrick Type K2WJ and Chopper Stabilizer K2PJ. |
| Function generators $G_1$, $G_2$, $G_3$, $G_4$ | Pace $X^2$ Fixed Diode Function Generator Model 16.022. |
| $R_{13}$, $R_{14}$ | 200,000 ohms. |
| $R_{15}$ | 350,000 ohms plus 0–100,000 ohms. |
| Capacitor $C_6$ | .033 microfarad. |

It was found that a wattage converter employing the foregoing components could be used for measuring the wattage consumed by load at substantially all power factors. A D.C. output signal of 20 volts was obtained with the two input signals $e_v$ and $e_i$ equal to two volts R.M.S. applied at input leads 21, 22 and 23, 24 over a band of frequencies ranging from 20 cycles to two kilocycles. For a 60 cycle signal, it was found that the accuracy is substantially plus or minus .25% of the full scale with a time constant of approximately 15 milliseconds.

Referring to the schematic circuit diagram of FIGURE 2, the operation of the wattage converter 10 will now be more fully described. When the load 11 is energized from an alternating supply, such as a 115 volt, 60 cycle supply, current will flow in the primary winding 40 of the current transformer 38 and a voltage will be induced in the secondary winding 41 which is proportional to the load current. The voltage across the secondary winding 41 of the current transformer 38 leads the current in the primary winding 40 by ninety degrees. This phase lead is corrected by the integrating circuit comprised of the amplifier $A_1$, the resistors $R_4$ and $R_5$ and the capacitors $C_4$ and $C_5$. Thus, the current transformer network 17 provides a voltage signal that is proportional and in phase with the load current and this voltage signal is supplied to the quarter square multiplying circuit 20 at input leads 23, 24.

Since the primary winding 31 of the potential transformer 30 is connected across the supply lines 12, 13 and load 11, the load voltage appears across the primary winding 31 and a voltage is induced across the secondary winding 32. Since the secondary winding 32 of the potential transformer 33 would normally have fewer turns than the primary winding 31 when operating with 100 or more volts across the primary winding 31, the voltage induced in the secondary winding 32 will be much smaller than the voltage across the primary winding 31 but will be in phase with the primary or load voltage.

The voltage divider consisting of the resistors $R_1$, $R_2$ provides a voltage signal $e_v$ at the input leads 21, 22 equal to a predetermined fractional part of the voltage across the secondary windings 34, 35. In the exemplification of the invention the voltage signal $e_v$ was set at two volts R.M.S. at the rated load voltage. The voltage signal $e_v$ is in phase with the voltage of the power supply and will vary proportionally therewith.

The voltage signals $e_v$ and $e_i$ are fed to the summing junction of amplifier $A_2$ where the signals are amplified and converted to an inverted sum of the voltage signals or the voltage signal, $-k(e_v+e_i)$. This voltage signal is fed to the input of biased diode function generators $G_1$ and $G_3$ and to the summing junction of amplifier $A_3$ through resistor $R_9$ for a gain of unity. The voltage signal $e_v$ is applied to the summing junction of amplifier $A_3$ through a resistor $R_{11}$ for a gain of $2k$.

Positive values of the voltage signal, $-k(e_v+e_i)$ are handled by the biased diode function generator $G_1$. Function generator $G_1$ and the sign reversing amplifier $A_4$ and resistor $R_{14}$ convert all positive values of this voltage signal to a negative current signal that is proportional to the square of the positive values of the voltage signal, $-k(e_v+e_i)$.

Negative values of the output voltage signal of amplifier $A_2$ are applied by electrical lead 45 to the input of the positively biased function generator $G_3$. This function generator converts the negative values of the voltage signal, $-k(e_v+e_i)$, to a negative current signal that is proportional to the square of negative values. In this manner, a negative current signal for all positive and negative values of the voltage signal, $-k(e_v+e_i)$ is supplied at the summing junction of operational amplifier $A_5$.

It will be noted that the output leads 46, 51 of operational amplifier $A_3$ are connected in circuit with the inputs of the biased diode function generators $G_2$ and $G_4$. The negatively biased function generator $G_4$ converts all positive values of the output voltage signal, $-k(e_v-e_i)$, to a positive current signal that is proportional to the square of these positive values. Now, the negative values of the voltage signal, $-k(e_v-e_i)$, are converted to a positive current signal that is proportional to the square of these negative values by the network which includes the function generator $G_2$, the sign reversing operational amplifier $A_4$ and resistor $R_{14}$.

It will be understood, therefore, that at the summing junction of operational amplifier $A_5$, there is provided a negative current, which is proportional to the square of both positive and negative values of the voltage signal, $-k(e_v+e_i)$ and a positive current, which is proportional to the square of both positive and negative values of the voltage signal, $-k(e_v-e_i)$. The resultant current is proportional to the product of the two instantaneous voltages $e_i$, $e_v$ applied at the input terminal leads $e_i$, $e_v$ of the wattage converter 10. This proportionality exists because the negative current representing the values of $k^2(e_v+e_i)^2$ is subtracted from the positive current representing values of $k^2(e_v-e_i)^2$ and because the product $-e_v e_i$ is equal to the quantity, $$\frac{k^2}{4}(e_v-e_i)^2 - \frac{k^2}{4}(e_v+e_i)^2$$

The amplifier $A_5$ of the integrator 26 changes the sign of resultant signal applied at its input so that the output voltage $e_o$ is proportional to the time integral of the product $e_v$, $e_i$. This product is proportional to the instantaneous load voltage and current, which shall hereinafter be referred to by the symbols, $e$ and $i$, respectively.

The integral of the product of the signals $e_v$, $e_i$ produces a voltage signal $e_o$ at the integrator output leads 27, 28 that is proportional to the product of the average values of the load voltage and load current multiplied by the cosine of the phase angle. Thus, the magnitude of the signal $e_o$ provides a quantitative measure of real or true power and the sign of the signal indicates whether power is being consumed or supplied by the electrical apparatus monitored.

How the integrator produces a signal proportional to the average values of the product of the load voltage and current multiplied by the cosine of the phase angle, which may be referred to as angle $\theta$, will now be explained. When the load 11 is connected across an alternating power supply having a current and voltage which can be expressed as a sinusoidal function the instantaneous values of the load voltage $e$, load current $i$, and power as follows:

$e = E \cos wt$
$i = I \cos (wt+\theta)$
Power $= ei = EI \cos wt \cos (wt+\theta)$, where E and I represent the amplitude of the voltage and current respectively and $w=2\pi f$, $f$ being the frequency in cycles per second.

The equation for power given above may be reduced to the following form containing the real and reactive components of the instantaneous values of power:

Power $= ei = \frac{1}{2} EI [\cos \theta (1+2 \cos 2wt) - \sin 2wt \sin \theta]$ When the instantaneous values of power are integrated over a period of $\pi$ radians, the factors, $\cos \theta \cos 2 wt$ and $\sin 2 wt \sin \theta$ integrate to zero. Accordingly, the average power is equal to $\frac{1}{2} EI \cos \theta$. Therefore, when the integrator 26 integrates the signal representing the product of the instantaneous values of $e$ and $i$, the output signal $e_o$ is proportional to the true wattage or $\frac{1}{2} EI \cos \theta$.

From the foregoing description of the wattage converter and its operation, it will be apparent that the wattage converter in accordance with the present invention produces a voltage signal proportional to the true wattage. It is possible to achieve an accuracy that is comparable to high grade portable wattmeters of the electrodynamic type. A particular advantage of the arrangement of the invention is that true power is metered by a voltage signal. The wattage converter of the invention is readily adaptable for use as a building block in analog and digital computers and can be used in conjunction with an X-Y recorder to record power consumed or supplied.

While the present invention has been described by reference to a preferred embodiment thereof, it is to be understood that many modifications may be made by those skilled in the art without actually departing from the invention. For example, it will be apparent that other types of multiplying circuits and integrators may be employed in the practice of the invention. It is, therefore, intended by the appended claims to cover all such modifications that fall within the true spirit and scope of the invention.

What I claim is new and desire to secure by Letters Patent of the United States is:

1. A wattage converter comprising a current transformer means adapted for monitoring the current of an alternating power supply and converting the current to a first electrical signal proportional in magnitude to said current; a potential transformer means adapted for monitoring the voltage of the power supply and converting the voltage to a second electrical signal proportional thereto; a multiplying circuit including a first input, a second input and at least one output lead, said first electrical signal being coupled to the first input of said multiplying circuit and said second electrical signal being coupled to the second input of said multiplying circuit, a first and a second operational amplifier, means coupling said first and second inputs with said first operational amplifier to provide a signal proportional to the sum of the instantaneous values of the first and second electrical signals, means including resistors coupling the output of said first operational amplifier and said first input with the input of said second operational amplifier to provide an output signal at said second operational amplifier proportional to the difference between said first and second electrical signals, said multiplying circuit including a first, second, third and fourth diode square function generator, said first and fourth function generators being negatively biased and, said second and third being positively biased, means coupling the output of said first operational amplifier with the inputs of said first and third function generators and coupling the output of said second operational amplifier with the inputs of said second and fourth function generators, a sign reversing means connected in circuit with the outputs of said first and second function generators, and means joining the output of said third and fourth function generator and the output of said sign reversing means in circuit with said output lead of the multiplying circuit, said multiplying circuit producing an electrical signal at said output lead proportional to the product of the instantaneous values of the first and second electrical signals; and an integrating means having its input coupled with the output of the multiplying circuit, said integrating means including an operational amplifier with a capacitor and resistor in the feedback path and converting said electrical signal produced by said multiplying circuit to an electrical signal proportional to the true wattage.

2. A wattage converter for producing a signal proportional to the true wattage of an electrical apparatus energized from an alternating power supply, said wattage converter comprising a current transformer means adapted for monitoring the current supplied to said apparatus and converting said current to a first voltage signal proportional in magnitude to said current; a potential transformer means including at least one primary winding adapted for connection across said power supply and converting the voltage of the power supply to a second voltage signal proportional thereto; a quarter square multiplying circuit having a first input, a second input and an output, said first and second voltage signals being coupled to said first and second inputs respectively, a first and second operational amplifier, circuit means coupling said first and second inputs with said first operational amplifier to provide a signal thereto proportional to the sum of the first and second voltage signals, circuit means including resistors coupling said first input and the output of said first operational amplifier with the input of said second operational amplifier to provide a signal at the output of the second operational amplifier proportional to the difference between said first and second voltage signals, a first, second, third and fourth diode square function generator, said first and fourth function generators being negatively biased and said second and third function generators being positively biased, means coupling the output of said first operational amplifier with the inputs of said first and third function generators and coupling the output of said second operational amplifier with the inputs of said second and fourth function generators, a sign reversing means connected in circuit with the outputs of said first and second function generators, and means connecting the output of said third and fourth function generators and the output of said sign reversing means in circuit with the output of said quarter square multiplying circuit, said quarter square multiplying circuit converting said first and second voltage signals to a signal at the output thereof proportional to the product of the instantaneous values of the current and voltage at said electrical apparatus; and an integrating circuit means coupled with the output of said quarter square multiplying circuit, said integrating circuit converting the output signal of said quarter square multiplying circuit to a voltage signal proportional to the product of the average values of the current and voltage at said apparatus multipled by the cosine of the phase angle.

3. An apparatus for converting true power of an alternating power supply to a voltage signal comprising a current transformer means having a primary winding adapted for monitoring current of the power supply and converting the current to a first electrical signal proportional in magnitude to said current; a potential transformer means adapted for monitoring the voltage of the power supply, said potential transformer means converting the voltage of the power supply to a second electrical signal having a magnitude proportional to the voltage of the power supply; a multiplying circuit including at least a first and a second input lead and an output lead, a first circuit means coupling the first electrical signal in circuit with said first input lead of said multiplying circuit, a second circuit means coupling the second electrical signal in circuit with said second input lead, a first and a second operational amplifier, means including resistors coupling the first and second input leads with the input of said first operational amplifier to provide a signal proportional to the sum of the first and second electrical signals, means including resistors coupling said first input lead and the output of said first operational amplifier with the input of said second operational amplifier to provide an output signal at said second operational amplifier proportional to the difference between said first and second electrical signals, a first, second, third and fourth diode square function generator, said first and fourth function generators being negatively biased and said second and third function generators being positively biased, means coupling the output of said first operational amplifier with the inputs of said first and third function generators and coupling the output of said second operational amplifier with the inputs of said second and fourth function generators, a sign reversing means connected in circuit with the outputs of said first and second function generators, and means connecting the outputs of said third and fourth function generators and the output of said sign reversing means in circuit with said output lead, said multiplying circuit converting said first and second electrical signals to an output electrical signal at its output lead proportional to the product of the instantaneous values of the voltage and current of the power supply; and an integrating means having its input coupled with the output lead of the multiplying circuit, said integrating means including an operational amplifier with a capacitor and resistor in the feedback path converting the output electrical signal of said multiplying circuit to an electrical signal at its output proportional to the true wattage of the power supply monitored.

4. An electrical apparatus for producing a voltage signal proportional to the true wattage consumed by a load energized from an alternating power supply, said apparatus comprising a current transformer means producing a first voltage signal proportional to the load current and in phase therewith; a potential transformer means providing a second voltage signal proportional to the load voltage; a quarter square multiplying circuit including a first and a second input, a first circuit means coupling said first voltage signal with the first input of said quarter square multiplying circuit, a second circuit means coupling said second voltage signal with the second input of said quarter square multiplying circuit, a first and a second operational amplifier, means coupling said first and second inputs with said first operational amplifier to provide a signal at the input thereto proportional to the sum of the first and second voltage signals, means coupling said first input and the output of said first operational amplifier with the input of said second operational amplifier to provide a signal at the output of said second operational amplifier proportional to the difference between said first and second voltage signals, a first, second, third and fourth diode square function generator, said first and fourth function generators being negatively biased and said second and third function generators being positively biased, means coupling the output of said first operational amplifier with the input of said first and third function generators and coupling the output of said second operational amplifier with the inputs of said second and fourth function generators, a sign reversing operational amplifier connected in circuit with the outputs of said first and second function generators, and circuit means connecting the outputs of said third and fourth function generators and the output of said sign reversing amplifier in circuit with the output of the quarter square multiplying circuit, said quarter square multiplying circuit producing an output signal proportional to the product of the instantaneous values of said first and second voltage signals, and an integrating circuit having its input coupled to the output of said quarter square multiplying circuit, said integrating circuit including an operational amplifier with a capacitor and resistor in the feedback path providing an output voltage proportional to the product of the average values of the load current and voltage multiplied by cosine of the phase angle.

5. A wattage converter for producing a voltage proportional to the true power provided by an alternating power supply, said wattage converter comprising a means transforming the current of the alternating power supply to a first electrical signal proportional in magnitude to said current; means supplying a second electrical signal proportional in magnitude to the voltage of the alternating power supply; a multiplying circuit having a first input and a second input and providing at the output thereof an electrical signal proportional to the product of the instantaneous values of the electrical signals applied at said first and second inputs, a first and a second operational amplifier, means coupling the first and second inputs in circuit with the first operational amplifier to provide a signal proportional to the sum of the first and second electrical signals, means coupling the first input and the output of said first operational amplifier with the input of said second operational amplifier to provide an output signal at the second operational amplifier proportional to the difference between said first and second electrical signals, a first, second, third and fourth diode function generator, said first and fourth function generators being negatively biased and said second and third function generators being positively biased, means coupling the output of said first operational amplifier with the inputs of said first and third function generators and coupling the output of said second operational amplifier with the inputs of said second and fourth function generators, a sign reversing amplifier connected in circuit with the outputs of said first and second function generators, circuit means connecting the outputs of said third and fourth function generators and the output of said sign reversing amplifier in circuit with the output of the quarter square multiplying circuit, circuit means coupling said first electrical signal with said first input of said multiplying circuit and coupling said second electrical signal with said second input of said multiplying circuit; and an integrating circuit having its input coupled to the output of the multiplying circuit, said integrating circuit including an operational amplifier having a capacitor and an impedance element in the feedback path thereof and converting said electrical signal provided by said multiplying circuit to a voltage proportional to the true power.

6. An electrical apparatus for producing a voltage proportional to the product of the average values of the current and voltage of an alternating power supply multiplied by the cosine of the phase angle, said apparatus comprising a first circuit means supplying from the power supply a first electrical signal proportional in magnitude to the current of the alternating power supply; a second circuit means supplying from the power supply a second electrical signal proportional in magnitude to the voltage of the alternating power supply; a quarter square multiplying circuit having a first input and a second input and providing at the output thereof an electrical signal proportional to the product of the instantaneous values of the electrical signals applied at said first and second inputs, said quarter square multiplying circuit including a first and a second operational amplifier, means coupling said first and second inputs in circuit with said first operational amplifier to provide a signal proportional to the sum of the electrical signals applied at said first and second inputs, means coupling said first input and the output of said first operational amplifier with the input of said second operational amplifier to provide a signal at the output of said second operational amplifier proportional to the difference between the signals applied at said first and second inputs, a first, second, third and fourth diode square function generator, said first and fourth function generators being negatively biased and said second and third function generators being positively biased, means coupling the output of said first operational amplifier with the inputs of said first and third function generators and coupling the output of said second operational amplifier with the inputs of said second and fourth function generators, a sign reversing means connected in circuit with the output of said first and second function generators, circuit means connecting the output of said third and fourth function generators and the output of said sign reversing means in circuit with the output of said quarter square multiplying circuit; circuit means coupling said first electrical signal with the first input of said quarter square multiplying circuit and coupling said second electrical signal with the second input of said quarter square multiplying circuit, and an integrating circuit having the input thereof coupled to the output of the quarter square multiplying circuit, said integrating circuit including an operational amplifier having a capacitor and a resistor connected in the feedback circuit thereof and converting the electrical signal applied at the input thereof to a voltage proportional to the product of the average values of the current and voltage of the alternating power supply multiplied by the cosine of the phase angle.

7. An electrical apparatus for producing a voltage signal proportional to the product of the average values of the current and voltage of an alternating power supply multiplied by the cosine of the phase angle, said apparatus comprising a first circuit means supplying from the alternating power supply a first voltage proportional in magnitude to the current of the alternating power supply and in phase therewith; a second circuit means supplying from the alternating power supply a second voltage proportional in magnitude to the voltage of the alternating power supply and in phase therewith; a multiplying circuit having a first input and a second input and producing at the output thereof an electrical signal proportional to the product of the instantaneous values of the voltages applied at said first and second inputs, circuit means coupling the first voltage supplied by said first circuit means with said first input and coupling the second voltage supplied by said second circuit means with said second input of said multiplying circuit, said multiplying circuit including a first and a second operational amplifier, means coupling the first and second inputs with said first operational amplifier to provide a signal proportional to the sum of the instantaneous values of the voltages applied at the first and second inputs, means coupling said first input and the output of said first amplifier in circuit with the input of said second operational amplifier to provide an output signal at said second amplifier proportional to the difference between said instantaneous values, a first, second, third and fourth diode square function generator, said first and fourth function generators being negatively biased and said second and third function generators being positively biased, means coupling the output of said first operational amplifier with the inputs of said first and third function generators and coupling the output of said second operational amplifier with the inputs of said second and fourth function generators, a sign reversing means connected in circuit with the outputs of said first and second function generators, and circuit means connecting the outputs of said third and fourth function generators and the output of said sign reversing means in circuit to provide the output of said multiplying circuit; and an integrating circuit having the input thereof coupled with the output of the multiplying circuit, said integrating circuit including an operational amplifier having a capacitor and a resistor in the feedback circuit thereof and said integrating circuit producing an output voltage proportional to the product of the average values of the current and voltage of the alternating power supply multiplied by the cosine of the phase angle.

References Cited by the Examiner
UNITED STATES PATENTS

| | | | |
|---|---|---|---|
| 2,810,107 | 10/1957 | Sauber | 324—132 |
| 2,817,818 | 12/1957 | Albert | 324—142 |
| 2,879,477 | 3/1959 | Miller | 324—142 |
| 2,992,365 | 7/1961 | Brill | 324—142 |

WALTER L. CARLSON, *Primary Examiner.*